United States Patent [19]

Wirtanen

[11] 4,105,339

[45] Aug. 8, 1978

[54] AZIMUTH MONITORING SYSTEM

[75] Inventor: Theodore E. Wirtanen, Chelmsford, Mass.

[73] Assignee: The United States of America as represented by the Secretary of the Air Force, Washington, D.C.

[21] Appl. No.: 762,079

[22] Filed: Jan. 24, 1977

[51] Int. Cl.² .............................................. G01B 11/26
[52] U.S. Cl. .................................... 356/152; 250/578; 356/172
[58] Field of Search .............................. 356/152, 172; 250/211 J, 578

[56] References Cited

U.S. PATENT DOCUMENTS

| | | | |
|---|---|---|---|
| 3,241,430 | 3/1966 | Kulick | 356/152 X |
| 3,486,826 | 12/1969 | Colvin et al. | 356/152 X |
| 3,564,257 | 2/1971 | Berry et al. | 250/211 J X |
| 3,816,000 | 6/1974 | Fiedler | 356/152 |
| 3,990,796 | 11/1976 | Foltz, Jr. | 356/152 |

*Primary Examiner*—S. C. Buczinski
*Attorney, Agent, or Firm*—Joseph E. Rusz; Henry S. Miller

[57] ABSTRACT

A system for monitoring changes in azimuth due to shifts in geological features of the earth's surface, using a collimated laser beam which is split and reflected from a plane mirror and a prismatic mirror to target area showing translational and rotational changes in the mirrors location. The beam is directed to a second pair of mirrors at an angle to the beam which will verify the location movement, source or target.

5 Claims, 1 Drawing Figure

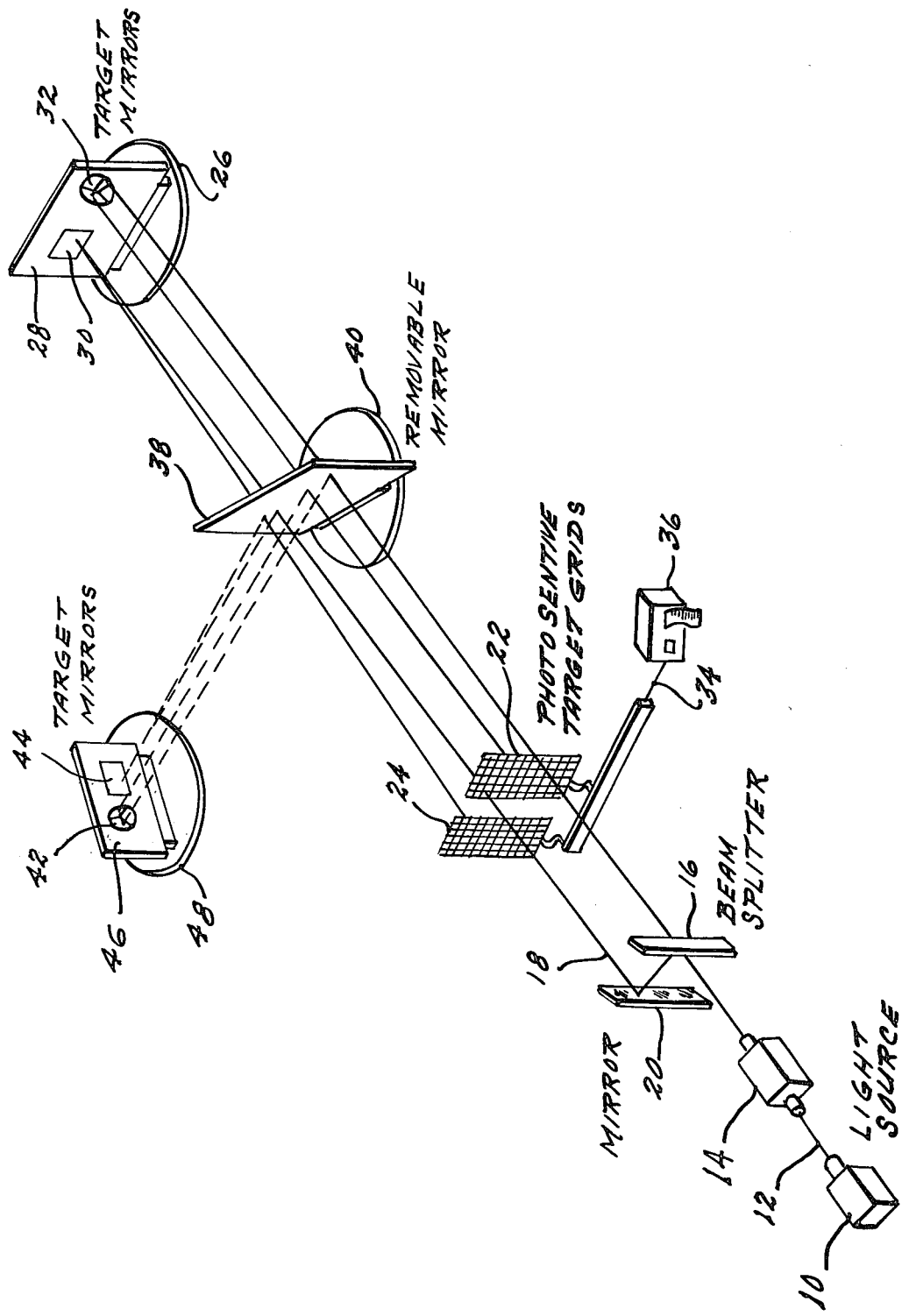

AZIMUTH MONITORING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to an azimuth monitoring system and more particularly to a system for monitoring changes in relative azimuth between widely separated points.

Relatively recent exploration of the earth has revealed that it's surface consists of a plurality of plates which move and shift as the earth expands. This has a direct effect on any azimuth reference system laid out on the earth's surface. Azimuth reference stations are laid out based upon astronomical observations and are used, in one instance, for calibrating inertial guidance systems. As the azmuth reference station shifts, it is necessary to take new observations to insure accuracy throughout the system. It is to be understood of course that movement of the azimuth reference system could be caused by other than plate shifting and earthquakes, as for example, by unusual weather events that might cause large scale earth disturbance.

Since astronomical measurements are time consuming, expensive and require expensive equipment, the most cost effective way to function is to avoid these observations and measurements whenever possible. A manner of achieving this goal is to provide a high quality monitoring system that will provide an indication of when the reference station has moved as well as the amount, type and direction of movements. This will allow one to decide whether or not to perform another astro determination.

Various systems have attempted in the past to provide effective monitoring, but none have been thus far completely successful. When utilizing mechanical devices such as strain gauges, the effects of motion on relative azimuth are not measured. These and other shortcomings found in prior art devices are overcome by the invention presented herein.

SUMMARY OF THE INVENTION

This invention relates to a system for monitoring azimuth utilizing a collimated laser beam as a light source, and a novel combination of plane mirrors and prismatic reflectors as targets. Rotational and translatory movements effect plane mirrors and prismatic reflectors and these effects are capable of being measured. The reflected beams of collimated laser light are reflected from the two mirrors and projected onto image dissectors formed of junction barriers, where minute movements of the image centroids will be detected and recorded.

In addition to the basic target station described, at least two similar target stations separated by approximately 90° in azimuth (when viewed from the light transmitter), are used to eliminate source-target movement ambiguities.

It is therefore an object of the invention to provide a new and improved azimuth monitoring system.

It is another object of the invention to provide a new and improved azimuth monitoring system that is more accurate than any similar system known in the prior art.

It is a further object of the invention to provide a new and improved azimuth monitoring system that detects and measures translatory as well as rotational movement.

It is still another object of the invention to provide a new and improved azimuth monitoring system that will operate in an automatic as well as manual mode.

It is another object of the invention to provide a new and improved automatic azimuth moitoring system that utilizes junction barriers to determine image centroids of reflected laser beams.

It is another object of the invention to provide a new and improved automatic azimuth monitoring system that is easily maintained.

These and other advantages, features and objects of the invention will become more apparent from the following description taken in the accompanying drawings.

DESCRIPTION OF THE PREFERRED DRAWING

The FIGURE is a schematic representation of the system of the invention.

DESCRIPTION OF THE PREFERRED EMBODIMENT

Referring now to the FIGURE, a laser light source is shown at 10, generating a beam 12 which passes through collimator 14. The beam is divided by beam splitter 16 from which beam 12 continues and beam 18 is formed. Beam 18 is reflected from mirror 20 and follows a path parallel to beam 12. Both beams pass through apertures in photosensitive target grids 22 and 24.

A target mirror support 26 is positioned on the azimuth reference station. A frame 28 holds plane mirror 30 and prismatic reflector 32 in the support. Laser beam 18 strikes and is reflected by mirror 30, back to target grid 24 which could consist of a junction barrier array. Beam 12 strikes and is reflected by the prismatic reflector to target grid 22, which is similar to grid 24.

Laser light striking the array formed on the target grid generates a current which is sent via line 34 to a recording instrument 36. If there has been no movement in the azimuth reference station, the reading from the recorder will so reflect. If there is movement, the instrument will record the quantity and direction of such movement.

Where recorder 36 shows that some movement, rotational from mirror 30 and grid 24 or translatory by prismatic reflector 32 and grid 22 has taken place, the system allows a further determination to be made as to where the movement originated from. The laser source and target mirrors are separated by a distance of approximately 100 meters. A removable plane mirror 38 is positioned on a base 40 in the path of beams 12 and 18. The laser beams are reflected to another set of target mirrors 42 and 44, positioned approximately 90° from the working direction of the beam. The mirrors are similar to the aforementioned target mirrors, having plane mirror 44 and prismatic reflector 42 mounted in frame 46 on base 48.

In operation, Laser light is reflected from target mirrors 42, 44, back to the removable mirror 38, and subsequently back to the photosensitive target arrays 22 and 24. When movement has occured and there is symmetry in the motion between the reflections of both or all, if there are additional target mirrors, the conclusion is that the light source 10 has moved. If there is non-symmetry between the readings from the target mirrors, then the appropriate conclusion is that any motion has occured in the azimuth reference station.

Although the invention has been described with reference to a particular enbodiment, it will be understood to those skilled in the art that the invention is capable of a variety of alternative embodiments within the spirit and scope of the appended claims.

What is claimed is:

1. A system for monitoring changes in azimuth between widely separated points comprising: a source for a beam of coherent radiation; means for collimating said beam, beam splitting means for dividing said beam into a plurality of parallel beams; mirror means for reflecting each of said plurality of beams, including a plane mirror for measuring rotational movement and a prismatic reflector for measuring translatory movement; photosensitive target means for receiving each of said beams, and recording means for receiving the output of said target means.

2. A system for monitoring changes in azimuth according to claim 1 wherein said photosensitive target means is a junction barrier array.

3. A system for monitoring changes in azimuth according to claim 1 wherein said photosensitive target means is a junction barrier array.

4. A system for monitoring changes in azimuth according to claim 1 further including a first removable beam reflective mirror positioned between said source and said mirror means and at proscribed angle thereto, and a second mirror means positioned to receive the beam reflected from said removable mirror and direct the beam to the phosensitive target means by way of said removable mirror.

5. A system for monitoring changes in azimuth according to claim 4 wherein the second mirror means includes a plane mirror for measuring rotational movement and a primatic reflector for measuring translatory movement.

* * * * *